United States Patent [19]
Gemmellaro

[11] 3,753,600
[45] Aug. 21, 1973

[54] AUTOMATIC BRAKE PRESSURE CONTROL DEVICE FOR PNEUMATIC ANTI-SKID VEHICLE BRAKING SYSTEMS

[75] Inventor: Carmelo Gemmellaro, Turin, Italy
[73] Assignee: FIAT Societa per Azioni, Turin, Italy
[22] Filed: July 20, 1972
[21] Appl. No.: 273,579

[30] Foreign Application Priority Data
July 24, 1971 Italy.............................. 69488 A/71

[52] U.S. Cl. .............. 303/21 F, 188/181 R, 303/63, 303/68
[51] Int. Cl............................................ B60t 8/06
[58] Field of Search...................... 303/21 F, 61–63, 303/68–69, 10, 6 C, 6 R; 188/181; 137/488, 494

[56] References Cited
UNITED STATES PATENTS
3,294,455   12/1966   Valentine........................ 303/63

FOREIGN PATENTS OR APPLICATIONS
795,218   9/1968   Canada................................ 303/68

Primary Examiner—Milton Buchler
Assistant Examiner—D. C. Butler
Attorney—Richard C. Sughrue, Robert V. Sloan et al.

[57] ABSTRACT

This invention provides a brake pressure control device for connection in series with the control valve of an anti-skid pneumatic braking system having an axially movable piston the position of which is determined by the difference between the pressure in a chamber communicating with the brake actuator itself and a chamber communicating with the brake pressure supply through a first floor restricting passage. The piston is normally in a closed position, but when the pressure at the brake actuator is released by the action of the anti-skid control valve upon detection of imminent wheel locking the piston moves into an operative position in which it places the said chamber in direct communication with the brake pressure supply while at the same time limiting the pressure supply to the brake control valve to a second restricted passage preventing sharp re-application of the brakes by the control valve.

5 Claims, 1 Drawing Figure

Patented Aug. 21, 1973
3,753,600
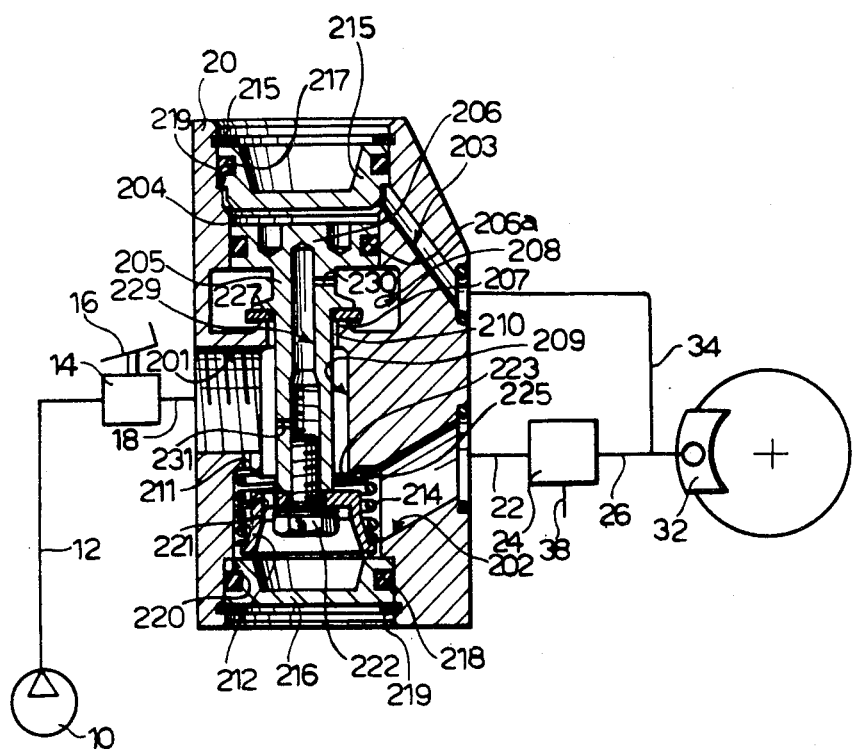

AUTOMATIC BRAKE PRESSURE CONTROL DEVICE FOR PNEUMATIC ANTI-SKID VEHICLE BRAKING SYSTEMS

The present invention relates to an automatic brake pressure control device for pneumatic anti-skid vehicle braking systems.

BACKGROUND OF THE INVENTION

In known vehicle anti-skid braking systems the delivery of fluid under pressure to the brake actuators takes place in substantially the same way both during normal braking, when the delivery circuit presents very small flow resistance to achieve high values of braking pressure in the shortest possible time, and under conditions of imminent locking of one or more wheels, when the anit-skid system intervenes to effect controlled release and re-application of the brakes.

The anti-skid braking system normally includes a control device for effecting a controlled gradual release of the braking pressure in order to avoid sudden changes in the brake pressure, which could give rise to jerky braking of the vehicle and adverse reaction on the vehicle steering.

By ensuring a gradual release of the braking pressure the aforesaid known systems avoid sudden jumps of the braking pressure applied to the wheel brake actuators of a vehicle. The re-application of braking pressure, which occurs during the re-application of the brakes following each successive brake release by the anti-skid control device, is not, however, gradual, and this could lead to jerky braking. Reduction of the re-applied brake pressure could be achieved by the introduction of a restrictor in the path of the pneumatic fluid from the pressure source to the respective brake actuators, but such a restrictor would retard excessively the application of pressure to the brakes in normal braking operations, for which, as stated previously, it is desirable to have the highest possible rate of increase of the braking pressure to give rapid braking response.

One solution which has been proposed for this problem consists in reducing the brake pressure reached in successive cycles of braking and brake release only during the intervention of the anti-skid control device, by employing two electromagnetically operated valves in combination.

An object of the present invention is to provide an anti-skid braking control system which has two different rates of increase of braking pressure for intermittent anti-skid braking and for normal braking respectively.

SUMMARY OF THE INVENTION

According to the present invention there is provided an automatic brake pressure control device for antiskid pneumatic braking systems for vehicles, characterised in that the device comprises in combination:

a. a body having an internal cavity constituted by a first chamber, a second chamber, a third chamber and a fourth chamber arranged coaxially, the first and fourth chambers communicating with each other through a first free flow passage and through a first restricted flow passage, and the first and second chambers communicating with each other through a second free flow passage and a second restricted flow passage;

b. a piston movable in the said cavity, having a head slidable fluid-tightly in the third chamber, and having an inoperative position in which it closes the first free flow passage between the first and fourth chambers and opens the second free flow passage between the first and second chambers and an operative position in which it opens the said first free flow passage and closes the said second free flow passage;

c. an inlet port opening into the first chamber and adapted to be connected to a source of pressure in use of the device;

d. a fluid delivery port opening into the second chamber and adapted to be connected to the input of a control valve for anti-skid braking control, and e. a control passage communicating with the third chamber and adapted to be connected to the output of the said control valve, the position of the piston being controlled by the pressure difference between the said third and fourth chambers to cause the piston to assume the inoperative position when the pressure in the third chamber is greater than or equal to the pressure in the fourth chamber and to assume the operative position when the pressure in the third chamber is less than the pressure in the fourth chamber.

Preferably the first restricted flow passage between the first and fourth chamber presents a fluid flow resistance at least equal to the resistance to flow of fluid from the first to the third chamber.

DETAILED DESCRIPTION OF ILLUSTRATED EMBODIMENT OF THE INVENTION

A preferred embodiment of the invention will now be described, by way of non-limiting example, with reference to the accompanying drawing, which is an axial section of an automatic brake pressure control device according to this invention, with the associated braking system represented diagrammatically.

In the drawing a braking system is shown having a source of pneumatic pressure 10 which supplies air under pressure through a line 12 to a normally closed distributor valve 14 capable of effecting continuous variation of the pneumatic pressure applied to the vehicle brakes under the control of a brake pedal 16. An output conduit 18 leads from the distributor valve 14 to an input port 201 of a pressure control device 20 according to the invention.

The body of the pressure control device 20 has an internal cavity comprising four cylindrical chambers 209, 221, 204, and 208 of different diameters, referred to herein as the first, second, third and fourth chambers respectively, the cavity being closed at its two ends by respective plugs 215, 216, provided with O-ring seals 217, 218 and held in position between two annular shoulders 219, 220 in the body of the device and respective elastic retaining rings 215, 219.

The first chamber 209 communicates freely with the fourth and second chambers 208, 221 respectively through first and second annular free flow passages 210, 223 defined in respective annular flanges 207, 225.

A piston 205 having an outside diameter substantially less than the internal diameters of the flanges 207, 225 is mounted in the passage 20, the piston 205 having a head 206 provided with a fluid tight O-ring seal 206a. The piston head 206 delimits the chamber 204 at one end of the device.

At the other end of the piston 205, within the chamber 223, (shown lowermost in the drawing) a screw bolt 222 is inserted to secure an obturator 212 of substantially annular shape to the said end. A spring 214 acts between the annular flange 225 and an outwardly projecting annular flange of the obturator 212.

The piston 205 also has a flange 227 in an intermediate position between the head 206 and the obturator 212. The flange 227 carries an annular sealing washer 228 adapted to co-operate with the annular flange 207, when the piston is lowered on to the latter, to interrupt communication between the chambers 208 and 209.

An axial blind bore 229 in the piston 205 communicates at one end with the chamber 208 through a flow restrictor 230, the bore 229 communicating with the chamber 209 through a flow restrictor orifice 231. The two chambers 208, 209 are therefore in communication when the piston 205 is in its lowermost position, as shown, through a first restricted flow passage (230, 229, 231).

The flange 225 is traversed by an orifice 221, referred to herein as the second restricted flow passage.

The first chamber 209 communicates through a delivery port 202 and an output conduit 22 with a control valve 24, forming part of an anti-skid braking control system of known type, which applies pressure to a caliper brake actuator 32 of a wheel (not shown) through a brake conduit 26. The control valve 24 includes an exhaust conduit 38 arranged to discharge the brake pressure when necessary due to the dynamic state of the wheel (i.e. imminent wheel locking), in the known manner.

A branch conduit 34 communicates with the brake conduit 26 and leads to a port 203 of the device 20, which in turn communicates with the third chamber 204 above the piston head 206.

OPERATION

Under normal braking conditions pneumatic pressure, controlled by the distributor valve 14, is applied to the first chamber 209 of the control device 20. Since the piston 205 is normally kept in its lowermost position by the spring 214, the air under pressure supplied to the chamber 209 passes to the second chamber 221 through the first free flow passage 223, which has a considerable cross-section, and thence through the delivery port 202 into the anti-skid control valve 24 to operate the caliper brake actuator 32. The air under pressure simultaneously reaches the third chamber 204 through the branch conduit 34 and the port 203 and also reaches the fourth chamber 208 through the first restricted flow passage presented by the orifice 231, the bore 229 and the orifice 230. This restricted flow passage introduces a delay before the pressure in the fourth chamber 208 becomes equal to that in the third chamber 204. Thereafter the same pressure acts upon the two faces of the piston head 206 and the piston 205 remains in equilibrium with the second free flow passage 223 open. The spring 214 acts on the piston, holding the obturator 212 sealed against the lower plug 216, to maintain a gap between the obturator 212 and the flange 225 and thereby allowing free passage of the air under pressure from the source 10 to the brake actuator 32.

If, during braking, the anti-skid system intervenes to discharge, through the conduit 38 of the valve 24, the pressure present in the brake conduit 26, the third chamber 204 is discharged through the port 203 and through the branch conduit 34, while the pressure applied by the distributor valve 14 is maintained in the fourth chamber 208. Consequently the piston 205 is thrust upwards by the pressure in the chamber 208, against the weak reaction of the spring 214, until the obturator 212 abuts the flange 225, thereby blocking the second free flow passage 223. When the control valve 24 is subsequently operated to re-admit pressure to the brake conduit 26, air under pressure from the distributor valve 14 reaches the second chamber 221 from the fourth chamber 208 only through the second restricted flow passage 211. Consequently the pressure in the conduit 26 rises gradually when the brakes are re-applied by the anti-skid control, in conformity with the stated object of the invention and for the reasons expressed previously.

The above-described cycle of operations may repeat itself indefinitely throughout the cycles of operation of the anti-skid braking system, thus ensuring that, in addition to gradual discharge of the brake pressure under control of the valve 24, according to known practice, a gentle and gradual fluctuation of braking pressure is applied to the caliper brake actuator 32, to prevent jerks and discontinuity in the functioning of the braking system.

I claim:

1. Automatic brake pressure control device for anti-skid pneumatic braking systems for vehicles, said device comprising combination:
   a. a body having an internal cavity constituted by a first chamber, a second chamber, a third chamber and a fourth chamber arranged coaxially;
   b. a first free flow passage and a first restricted flow passage, both interconnecting said first and fourth chambers;
   c. a second free flow passage and a second restricted flow passage, both interconnecting said first and second chambers;
   d. a piston movable in said cavity, said piston having a head slidable fluid-tightly in said third chamber and having an inoperative position in which said piston closes said first free flow passage between the first and fourth chambers and opens said second free flow passage between the first and second chambers and having an operative position in which said piston opens said first free flow passage and closes the said second free flow passage;
   e. an inlet port opening into said first chamber and adapted to be connected to a source of pressure in use of the device;
   f. a fluid delivery port opening into said second chamber and adapted to be connected to the input of a control valve for anti-skid braking control, and
   g. a control passage communicating with said third chamber and adapted to be connected to the output of the said control valve, and wherein
      the position of the piston is controlled by the pressure difference between said third and fourth chambers to cause the piston to assume said inoperative position when the pressure in the third chamber is greater than or equal to the pressure in said fourth chamber and to assume said operative position when said pressure in the third chamber is less than the pressure in the fourth chamber.

2. Device as claimed in claim 1, wherein said first restricted flow passage between said first and said fourth chamber presents a fluid flow resistance at least equal to the resistance to flow of fluid from said first to said third chamber.

3. Device as claimed in claim 1, including a spring urging said piston into its inoperative position.

4. Device as claimed in claim 1, wherein said first restricted passage between said first and said fourth chamber is constituted by an axially extending cavity in the piston, and by throttle orifices communicating with said cavity and opening respectively into said first and said fourth chambers 5. Device as claimed in claim 1, wherein said second restricted flow passage between said first and said second chambers comprises an orifice in the body of the device.

* * * * *